US006970607B2

(12) United States Patent
Jia et al.

(10) Patent No.: US 6,970,607 B2
(45) Date of Patent: Nov. 29, 2005

(54) METHODS FOR SCANNING AND PROCESSING SELECTED PORTIONS OF AN IMAGE

(75) Inventors: Charles Chi Jia, San Diego, CA (US); Anne-Marie Woodson, Lemon Grove, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 09/946,246

(22) Filed: Sep. 5, 2001

(65) Prior Publication Data

US 2003/0044086 A1 Mar. 6, 2003

(51) Int. Cl.⁷ .............................................. G06K 9/32
(52) U.S. Cl. ...................... 382/296; 382/289; 382/318; 382/282; 358/538
(58) Field of Search ................................ 382/289, 290, 382/291, 292, 293, 294, 296, 312, 318, 319, 382/282; 358/452, 453, 537, 538, 474

(56) References Cited

U.S. PATENT DOCUMENTS

| 5,452,374 A | * | 9/1995 | Cullen et al. ............... 382/293 |
| 5,528,387 A | * | 6/1996 | Kelly et al. .................. 358/488 |
| 5,594,556 A | * | 1/1997 | Vronsky et al. ............ 358/482 |
| 5,901,243 A | * | 5/1999 | Beretta ........................ 382/168 |
| 5,901,253 A | | 5/1999 | Tretter ........................ 382/289 |
| 6,049,636 A | * | 4/2000 | Yang ........................... 382/289 |
| 6,430,320 B1 | * | 8/2002 | Jia et al. ..................... 382/289 |

* cited by examiner

Primary Examiner—Yon J. Couso

(57) ABSTRACT

Methods are provided for use with a computing device and an image scanning device. One method includes performing a scan to produce a preview scanned image, selecting a portion of the preview scanned image for final scanning, and scanning the selected portion of the preview scanned image to produce a final scanned image. Performing the scan to produce the preview scanned image may include performing an autocrop process and a deskew process before displaying the preview scanned image to the user. Once the preview scanned image is displayed, then the user may decide to selectively rotate the preview scanned image, for example, about an anchor point that was used in the deskew process. The user may also select a portion of interest within the image. Once the user is satisfied with the user selected rotation, if any, and the user selected portion of interest, then a final scan will be performed. As part of the final scan process, the method includes calculating an effective portion of the preview scanned image. The effective portion encompasses the selected portion of the preview scanned image. This effective portion or area of the scanner bed is then scanned at the final scan resolution. The resulting scanned effective portion image is then rotated based on the angular parameters associated with the deskew and user selected rotation. Once rotated, the scanned effective portion image is then cropped to match the user selected portion of interest. The resulting portion of interest can then be displayed and stored.

6 Claims, 4 Drawing Sheets

METHODS FOR SCANNING AND PROCESSING SELECTED PORTIONS OF AN IMAGE

TECHNICAL FIELD

The present invention relates generally to computers and image scanning devices, and more particularly to methods for scanning and processing selected portions of an image.

BACKGROUND

In a conventional computer-based scanning environment, wherein a computer is operatively coupled to a flatbed scanner, the user opens the cover of the scanner, places the item to be scanned on the scanner's bed, closes the cover, and initiates a scanning process.

Once initiated, the scanning process typically performs a quick low-resolution scan of the entire bed. This initial or preview scan can serve several purposes. Firstly, the preview scan allows advanced scanning software (typically running in the computer) to determine the location/area of the item being scanned with respect to the overall area of the bed. Such an autocrop process reduces the size of the subsequent final scan or rescan of the item by only scanning a likely smaller area of the bed encompassing the item.

Secondly, the advanced scanning software may be able to determine if the item has been placed on the bed at an angle, i.e., skewed with respect to the orientation of the bed of the scanner. If so, then the deskew process can rotate the preview scanned image of the item, as needed, to align it with the horizontal/vertical orientation of the scanner bed. This can be an automatic process too.

As a result of the autocrop and deskew processes, rather than rendering the entire scanned bed of the scanner with the item therein, the advanced scanning software can render a cropped and deskewed image of the item. The user may then decide to proceed with a final higher-resolution scan.

Sometimes, however, the user may only be interested in a portion of the scanned image. Here, the user may decide to go ahead with the final scan and subsequently manually cut out or otherwise select the portion of interest using another software application, such as, e.g., a drawing application. This requires access to and knowledge of the requisite resources. Furthermore, such efforts take additional time and often require the storage and/or handling of initially large data files. Such processing might also cause degradation in the image quality.

Consequently, for these reasons and others, it would be beneficial to have improved methods for use during the scanning process that allow the user to select portions of a preview image for subsequent final scanning.

SUMMARY

The present invention provides methods for use during a scanning process; the methods allow the user to select portions of a preview scanned image for subsequent final scanning.

The above stated needs and/or others are satisfied, for example, by a method for use with an image scanning device, in accordance with certain exemplary implementations of the present invention. The method includes performing a scan to produce a preview scanned image of a target item and deskewing the preview scanned image. The method further includes allowing the user to selectively manipulate the deskewed preview scanned image and select a portion of the preview scanned image for final scanning. The method then includes scanning a region of the target item corresponding to the selected portion of the manipulated preview scanned image to produce a final scanned image. Performing the scan to produce the preview scanned image may include performing an autocropping process before displaying the preview scanned image to the user. Once the preview scanned image is displayed, then the user may decide to selectively rotate the preview scanned image, for example, about an anchor point that was used or otherwise identified in the deskew process. The user may also select a portion of interest within the image. Once the user is satisfied with the user selected manipulation (e.g., rotation), if any, and the user selected portion of interest, then a final scan of at least the corresponding region of the target item is performed. As part of the final scan process, the method may include calculating an effective portion of the target item, wherein the effective portion encompasses the region of the target item corresponding to the selected portion of interest. This effective portion or area of the scanner bed is then scanned at the final scan resolution. The resulting scanned effective portion image is then rotated based on the angular parameters associated with the deskew process and user selected manipulation (e.g., rotation). Once rotated, the scanned effective portion image is then cropped to match the user selected portion of interest. This resulting portion of interest final scan image data may then be displayed, printed, provided to an application, and/or stored for subsequent access/processing.

BRIEF DESCRIPTION OF THE DRAWINGS

A more complete understanding of the various methods of the present invention may be had by reference to the following detailed description when taken in conjunction with the accompanying drawings wherein.

DETAILED DESCRIPTION

Figure 1:
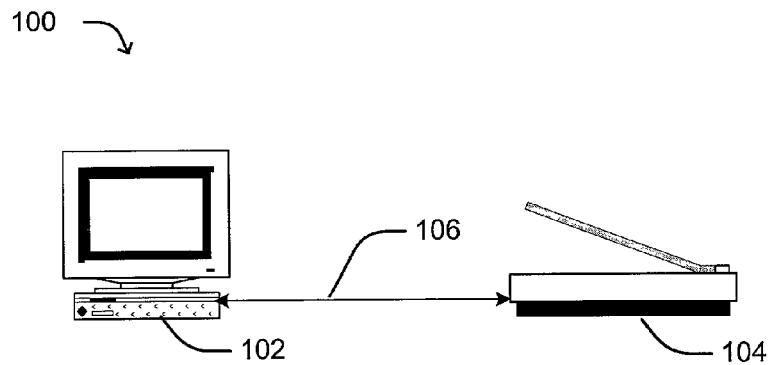
FIG. 1 illustratively depicts a conventional computer operatively coupled to an image scanning device, in accordance with certain exemplary implementations of the present invention.

FIG. 1 illustratively depicts a computing environment 100 having a conventional computer 102 that is operatively coupled to an image scanning device 104 through a communication link 106, in accordance with certain exemplary implementations of the present invention.

Computer 102 is representative of any computing device that is capable of interfacing with image scanning device 104. Image scanning device 104 is represented in FIG. 1 by a flat bed scanner. Nevertheless, scanning device 104 may also represent other types of scanners, copiers, and/or other like image processing devices that are configured to scan images and generate an associated file(s).

In accordance with certain aspects of the present invention, methods are provided for processing image data that has been scanned by image scanning device 104. These methods may be implemented in logic provided within computer 102 and/or image scanning device 104. The term "logic" as used herein is meant to represent hardware, firmware and/or software that is configured to perform certain processes relating to the scanning process and any follow-on image data processing. Since the methods provided herein take advantage of certain known processes, the remaining portions of this detailed description will focus on certain exemplary implementations of the present invention without going into great detail on these supporting processes.

Figure 2:
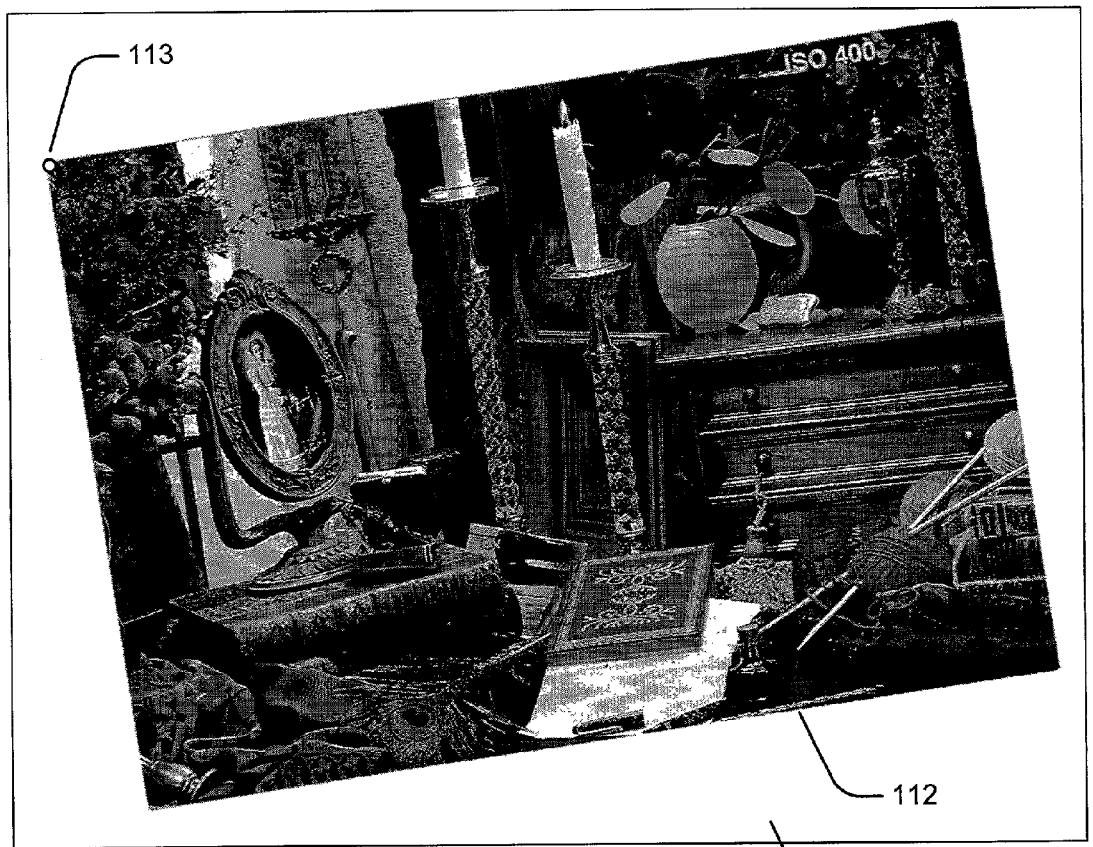
FIG. 2 illustratively depicts a preview scanned image of a photograph that has been positioned on the bed of an image scanning device, for example, as in FIG. 1, in such a manner that the photo is not oriented properly with respect to the bed, in accordance with certain exemplary implementations of the present invention.

With this in mind, attention is now drawn to FIG. 2, which illustratively depicts a preview scanned image 112 of a photograph that has been positioned on the bed 110 of image scanning device 104 and preview scanned. The preview scan is typically a low-resolution scan that produces data suitable for use by certain processes, e.g., various automated processes and/or manual (user) processes. By way of example, an automatic crop (autocrop) process may be implemented to determine the area or approximate area within bed 110 where the image to be scanned during a final scan process is located. In this example, the photograph only takes up a portion of the overall area of bed 110. Thus, during the final scan it would be advantageous to only scan a portion of the area of bed 110 that includes the photograph. The autocrop process will produce parameters identifying the area of bed 110 that is occupied by the photograph. Techniques for accomplishing such autocrop processes are well known.

Another process that would be useful in this preview scan example is an automatic deskew process. As can be seen, preview scanned image 112 is tilted or skewed with respect to the borders of bed 110, which typically form a rectangle. A deskew process would attempt to adjust the orientation of the resulting preview scanned image 112 so that it is aligned with the bed 110 in some way. This can be accomplished, for example, by identifying an anchor point 113 for preview scanned image 112 and rotating the image about anchor point 113 until the preview scanned image is properly aligned. In this example, since the photograph is itself a rectangle and includes easily detected edges, the resulting alignment should be correct. In this manner, the deskew process will have associated with it, parameters identifying anchor point 113 and a deskew angle. Deskew processes are also well known.

By way of further example, exemplary autocrop and deskew processes are described in U.S. Pat. No. 5,901,253, which was issued to Daniel R. Tretter and titled "Image Processing System With Image Cropping And Skew Correction", and which is hereby is incorporated by reference.

Figure 3:
FIG. 3 illustratively depicts the resultant preview scanned image of FIG. 2 following automatic crop and deskew processes that cause the preview scanned image of the photograph to be properly oriented with respect to the bed, in accordance with certain exemplary implementations of the present invention.

The result of an autocrop process and deskew process is illustrated by image 114 in FIG. 3. As shown, the preview scanned image data has been processed to include only the data associated with the photograph. This data has been deskewed such that the resulting rendered image is "correctly" positioned. In accordance with certain aspects of the present invention, following the preview scan and the autocrop and deskew processes, the user is provided with an image similar to that depicted in FIG. 3.

The user may then (optionally) modify the resulting preview scanned image 114 using other image processing tools. For example, the user may selectively modify the color space of the image, sharpen the image, smooth the image, and/or apply various filters to the image. These processes may produce certain parameters, etc., that are to be applied to the final scanned image and/or the final image scanning process itself. Such techniques are well known.

Figure 4:
FIG. 4 illustratively depicts the resultant preview scanned image of FIG. 3 following a user manipulation process that has caused the preview scanned image of the photograph to be selectively rotated about an anchor point and a portion of interest to be selected within the preview scanned image of the photograph, in accordance with certain exemplary implementations of the present invention.

In accordance with certain aspects of the present invention, the user is also allowed, at this image manipulation stage, to select a portion of interest within the preview scanned image. The portion of interest may be the entire image or a portion thereof. The user may also selectively rotate the image, for example, about anchor point 113. FIG. 4 illustrates an exemplary portion of interest and user rotation.

Here, the user has rotated the image about anchor point 113 as illustrated by the resultant preview scanned image 116. The user may, for example, use a graphical user interface (GUI) and associated pointing input device (e.g., a mouse) to rotate the image. In other implementations, the user may simply enter an angle of rotation, e.g., 15 degrees. As illustrated by the white outline box over image 116, the user has selected a portion of interest 118. In this example, the portion of interest includes a picture frame within the photograph. Again, the user can make such selections via a GUI, or by entering the requisite coordinates, etc.

Here, what is important to recognize in the exemplary photograph is that the picture frame in the portion of interest 118 appears skewed in the autocropped and deskewed image 114 of FIG. 3. However, in FIG. 4, the user has essentially deskewed the picture frame by rotating image 116 until the picture frame appears to be fairly vertical. The resulting portion of interest 113 in this example falls within a rectangular area surrounding the picture frame. It is this area of interest that the user wishes to complete a final scan of. Typically, the final scan will be at a higher resolution.

Figure 5:
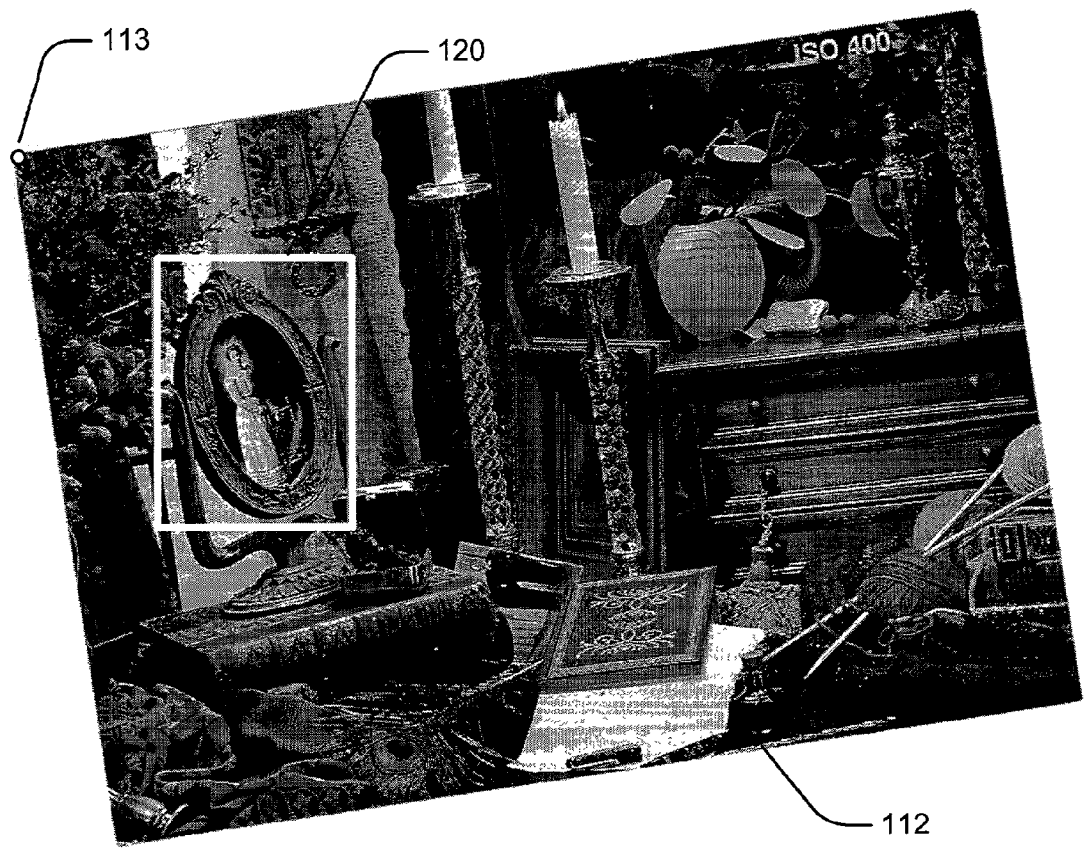
FIG. 5 illustratively depicts the preview scanned image of the photograph again oriented as in FIG. 2, but with an effective portion that is to be scanned during a final scan process, the effective portion encompassing the portion of interest selected by the user in FIG. 4, in accordance with certain exemplary implementations of the present invention.

Attention is now drawn to FIG. 5. In order to complete the final scan of the portion of interest 113, an effective portion 120 of the actual preview scanned image 112 needs to be calculated based on applicable automatically selected parameters and the user selected parameters.

As depicted in FIG. 5, the effective portion 120 is a rectangle that is large enough to encompass the image data identified as being within the portion of interest 113 of FIG. 4. Thus, for example, the effective portion 120 may be calculated based on the coordinates of portion of interest 113. This calculation also takes into account the deskew angle and the user selected rotation angle.

Figure 6:
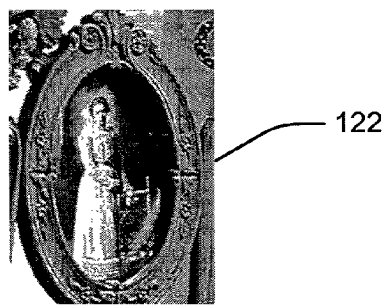
FIG. 6 illustratively depicts a final scanned image of the portion of interest identified by the user in FIG. 4 following further deskew and cropping processes, in accordance with certain exemplary implementations of the present invention.

FIG. 6 depicts the result of the final scan, as displayed to the user. Here, the final scanned image 122 includes the data associated with the portion of interest 113. The final scanned image 122 has been rotated based on a combined deskew angle and user selected rotation angle, and cropped based on the user selected portion of interest coordinates. As shown, the picture frame within the photograph is included within the resulting final scanned image 122.

Figure 7:
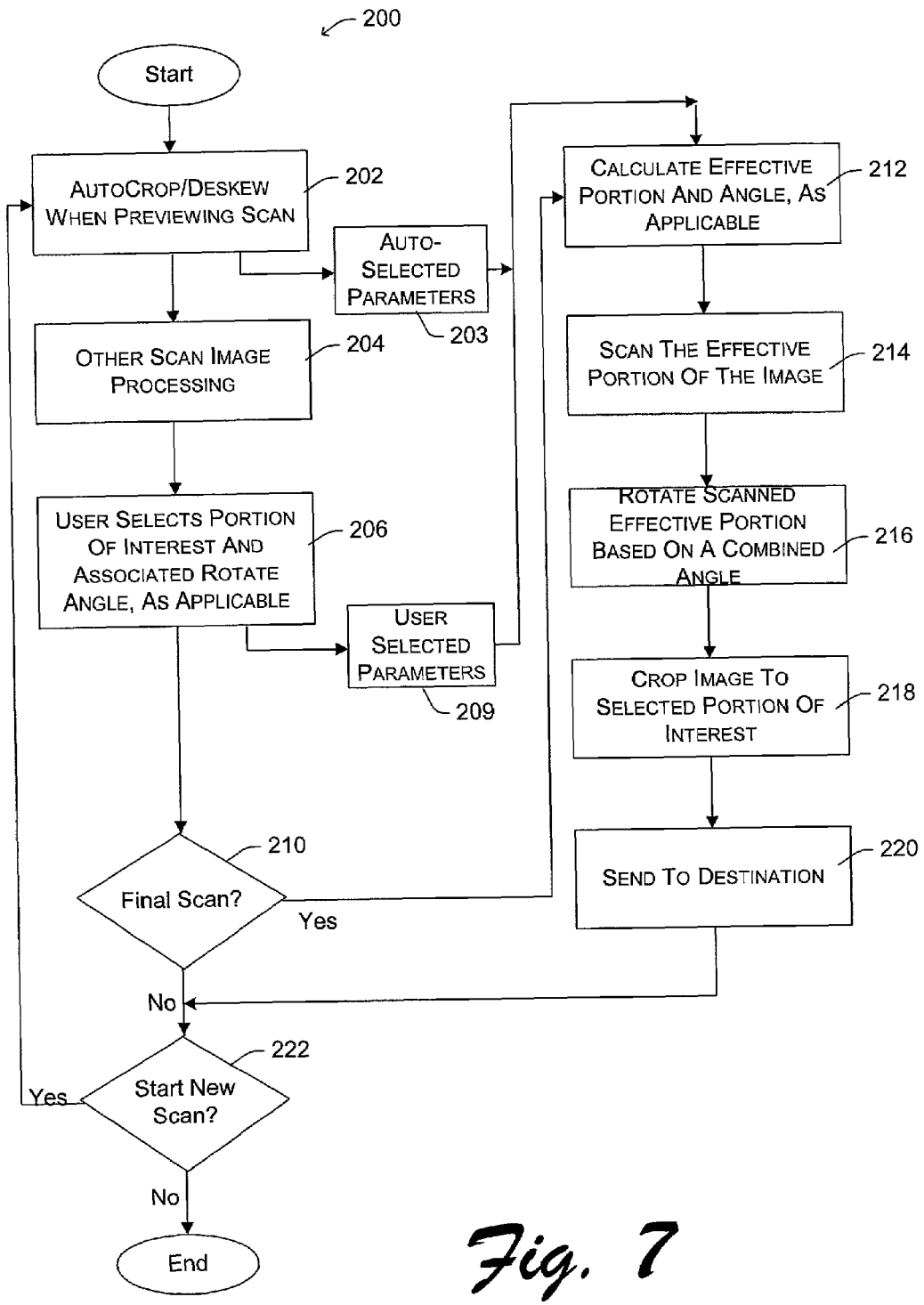
FIG. 7 is a flow diagram depicting a method for processing a scanned image, for example, as illustratively depicted in FIGS. 2–6, in accordance with certain exemplary implementations of the present invention.

With the preceding examples in mind, FIG. 7 is a flow diagram depicting a process 200 for producing a final scanned image 122, for example, as illustratively depicted in FIGS. 2–6, in accordance with certain exemplary implementations of the present invention.

In step 202, the autocrop and deskew processes are conducted on a preview scanned image 112 of a target item (e.g., any item that includes a somewhat flat light reflecting surface). These automated processes produce corresponding auto-selected parameters 203. The resulting autocropped and deskewed preview scanned image 114 may be processed by other scanned image processes in step 204. Next, in step 206, the user selects at least one portion of interest 118 and is allowed to selectively rotate the image 116 if desired. These user processes produce corresponding user selected parameters 209.

In step 210 a decision is made by the user as to whether to proceed with a final scan. If the user elects to proceed with the final scan, then process 200 continues with step 212. In step 212, at least one effective portion 120 is calculated based on the portion of interest 118 and any auto-selected and/or user selected angular parameters, for example, with respect to an anchor point 113. The effective portion defines the region of the bed 110 that is to be scanned during the final scan. The final scan of effective portion 120 is performed in step 214.

Following the final scan, in step 216 the scanned effective portion 120 is rotated (selectively deskewed) based on the combined angular parameters (auto-selected and user selected). In step 218, the rotated image is then cropped to produce the portion of interest 118. The resulting image data is then provided to a desired destination, in step 220. For example, a data file may be saved to a hard drive (not shown) in computer 102, or otherwise provided to an application running in computer 102. Process 200 then continues to step 222.

Returning to step 210, if the user elects not to have a final scan conducted, then process 200 continues to step 222. In step 222, it is determined by the user if a new scan is to be made; if so, then process 200 returns to step 202; if not, then process 200 ends.

Although some preferred implementations of the various methods of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method for use with an image scanning device, the method comprising:
    performing a scan of a target item to produce a preview scanned image;
    performing a deskew process on the preview scanned image to form a deskewed preview scanned image;
    selectively manipulating the deskewed scanned image and selecting a portion of the manipulated preview scanned image for final scanning;
    scanning a region of the target item corresponding to the selected portion of the manipulated preview scanned image to produce a final scanned image;
    wherein scanning the region of the target item corresponding to the selected portion of the manipulated preview scanned image to produce a final scanned image further includes: calculating an effective portion encompassing the region of the target item corresponding to the selected portion of the manipulated preview scanned image; and scanning the effective portion to produce a final scanned effective portion image that includes an image of the region of the target item corresponding to the selected portion of the deskewed preview scanned image;
    and wherein calculating the effective portion further includes: calculating the effective portion based on auto selected parameters and user selected parameters.

2. The method as recited in claim 1, wherein the auto selected parameters include coordinate parameters associated with an autocrop process, and angular parameters associated with the deskew process.

3. The method as recited in claim 1, wherein the user selected parameters include coordinate parameters associated with the selected portion of the manipulated preview scanned image.

4. The method as recited in claim 1, wherein the user selected parameters include angular parameters associated with the selected portion of the manipulated preview scanned image.

5. A method for use with an image scanning device, the method comprising:
    performing an initial scan of a target item to produce an initial scanned image having a first resolution; performing an autocrop process on the initial scanned image to produce an autocropped initial scanned image;
    performing a deskew process on the autocropped initial scanned image to produce a deskewed initial scanned image; displaying the deskewed initial scanned image;
    providing a user interface configured to allow a user to select at least one portion of the displayed initial scanned image; providing a user interface configured to allow a user to selectively rotate the displayed initial scanned image;
    performing a subsequent scan of a region of the target item corresponding to the selected portion of the displayed initial scanned image to produce a final scanned image having a second resolution that is greater than the first resolution;
    rotating the final scanned image based on a combined auto-selected angular parameter and user selected angular parameter;
    and cropping the rotated final scanned image to match the user selected portion of the displayed initial scanned image.

6. A computer readable medium having computer instructions for performing acts comprising:
    causing a preview scan of a target item to produce a preview resolution scanned image of the target item;
    performing an autocrop process on the preview resolution scanned image to produce an autocropped preview scanned image;
    performing a deskew process on the autocropped preview scanned image to produce a deskewed preview scanned image;
    causing the deskewed preview scanned image to be displayed;

receiving user inputs that select at least one portion of the displayed preview scanned image;

receiving user inputs that selectively rotate the displayed preview scanned image;

causing a subsequent scan of a region of the target item corresponding to the selected portion of the displayed preview scanned image to be performed to produce a final resolution scanned image; and rotating the final resolution scanned image based on a combined auto-selected angular parameter and user selected angular parameter;

and cropping the rotated final scanned image based on the user selected portion of the displayed preview scanned image.

* * * * *